(12) United States Patent
Nakagawa

(10) Patent No.: US 10,401,184 B2
(45) Date of Patent: Sep. 3, 2019

(54) INFORMATION PROCESSING DEVICE AND INFORMATION PRESENTATION SYSTEM

(71) Applicant: CLARION CO., LTD., Saitama (JP)

(72) Inventor: Yuichiro Nakagawa, Saitama (JP)

(73) Assignee: CLARION CO., LTD., Saitama (JP)

(*) Notice: Subject to any disclaimer, the term of this patent is extended or adjusted under 35 U.S.C. 154(b) by 108 days.

(21) Appl. No.: 15/863,839

(22) Filed: Jan. 5, 2018

(65) Prior Publication Data
US 2018/0195871 A1    Jul. 12, 2018

Related U.S. Application Data

(63) Continuation of application No. PCT/JP2016/068143, filed on Jun. 17, 2016.

(30) Foreign Application Priority Data

Jul. 9, 2015    (JP) ................................ 2015-137692

(51) Int. Cl.
    *G01C 21/36*      (2006.01)
    *G06F 16/00*      (2019.01)
                       (Continued)

(52) U.S. Cl.
    CPC ..... *G01C 21/3484* (2013.01); *G01C 21/3617* (2013.01); *G06F 16/00* (2019.01); *G09B 29/00* (2013.01); *G09B 29/10* (2013.01)

(58) Field of Classification Search
    CPC . G01C 21/3484; G01C 21/3617; G06F 16/00; G09B 29/00; G09B 29/10
                       (Continued)

(56) References Cited

U.S. PATENT DOCUMENTS 6,026,375 A * 2/2000 Hall ..................... G06Q 10/08
                                                       701/533
7,233,861 B2 * 6/2007 Van Buer ........... G01C 21/3617
                                                       340/994

(Continued)

FOREIGN PATENT DOCUMENTS

JP     2005-339279 A    12/2005
JP     2009-139129 A    6/2009
(Continued)

OTHER PUBLICATIONS

EP, 16821221.5 Extended Search Report, dated Oct. 22, 2018.
WO, PCT/JP2016/068143 ISR, Sep. 6, 2016.

*Primary Examiner* — Tan Q Nguyen
(74) *Attorney, Agent, or Firm* — One LLP

(57) ABSTRACT

The information processing device of the present invention comprises a pattern storage unit which stores a plurality of user patterns containing a classification pattern as a pair of input information that is input based on an input operation related to a predetermined setting item and one among a plurality of operation results that may be selected as a result of the input operation, for each of the plurality of pieces of input information that are mutually different; an operation result information input unit to which is input operation result information related to operation results selected by the user with regard to each of the one or more input operations previously performed by the user; a pattern specification unit which specifies one user pattern among the plurality of stored user patterns based on the input operation result information; and an operation result selection unit which selects one operation result among a plurality of operation results derived from one of the input operations performed by the user based on the specified one user pattern.

8 Claims, 11 Drawing Sheets

(51) Int. Cl.
  *G01C 21/34* (2006.01)
  *G09B 29/00* (2006.01)
  *G09B 29/10* (2006.01)

(58) Field of Classification Search
  USPC .......................................................... 701/537
  See application file for complete search history.

(56) References Cited

U.S. PATENT DOCUMENTS

2002/0143490 A1* 10/2002 Maeda ............... G01C 21/3484
                                            702/150
2003/0036848 A1   2/2003 Sheha et al.
2010/0268578 A1* 10/2010 Fushimi ................ G06Q 30/02
                                            705/7.29
2013/0262479 A1* 10/2013 Liang ................ G06F 16/24578
                                            707/748

FOREIGN PATENT DOCUMENTS

| JP | 2010-182340 A | 8/2010 |
| JP | 2011-70396 A  | 4/2011 |

* cited by examiner

FIG. 6

| CLASSIFICATION | NAME | | SERVICE | |
|---|---|---|---|---|
| COFFEE SHOP | ○○ STORE | FREQUENCY: 60% | DRIVE-THROUGH | FREQUENCY: 30% |
| | ○○ STORE | FREQUENCY: 40% | DRIVE-THROUGH | FREQUENCY: 70% |
| | ×× STORE | FREQUENCY: 80% | DRIVE-THROUGH | FREQUENCY: 20% |
| GAS STATION | △△ STORE | FREQUENCY: 50% | CAR WASH | FREQUENCY: 30% |

FIG.8

| CLASSIFICATION | NAME | SERVICE |
|---|---|---|
| COFFEE SHOP | ○○STORE | DRIVE-THROUGH |
| COFFEE SHOP | ××SHOP | DRIVE-THROUGH |
| ⋮ | ⋮ | ⋮ |

481 — CLASSIFICATION
482 — NAME
483 — SERVICE
310

FIG. 9a

| SERVICE/NAME | ○○ CHAIN | AAA GAS | TOTAL |
|---|---|---|---|
| GAS UP (SELF SERVICE) | 50 TIMES (25%) | 20 TIMES (10%) | 70 TIMES (35%) |
| CAR WASH | 100 TIMES (50%) | 30 TIMES (15%) | 130 TIMES (65%) |
| TOTAL | 150 TIMES (75%) | 50 TIMES (25%) | 200 TIMES |

FIG. 9b

| CLASSIFICATION | NAME | | |
|---|---|---|---|
| GAS STATION | ○○ CHAIN | FREQUENCY: 80% | FREQUENCY: 60% |
| GAS STATION | AAA GAS | FREQUENCY: 60% | FREQUENCY: 50% |
| | | GAS UP (SELF SERVICE) | CAR WASH |
| | | SERVICE | |

INFORMATION PROCESSING DEVICE AND INFORMATION PRESENTATION SYSTEM

CROSS-REFERENCE TO RELATED APPLICATIONS

The subject application is a continuation of PCT Patent Application No. PCT/JP2016/068143, filed Jun. 17, 2016, which claims priority to Japanese Patent Application No. 2015-137692, filed Jul. 9, 2015, both of which are incorporated by reference herein in their entirety for all purposes.

TECHNICAL FIELD

The present invention relates to an information processing device and an information presenting system.

BACKGROUND ART

Conventionally, known is a car navigation device which presents recommendation information to a user based on the user's action history (for instance, refer to Japanese Patent Application Publication No. 2009-139129).

SUMMARY OF THE INVENTION

The conventional technology entailed a problem in that a proper operation result could not be selected for a user in cases where the user's operation history has not yet been sufficiently accumulated, such as shortly after the user started using the car navigation device.

According to the first mode of the present invention, an information processing device comprises: a pattern storage unit which stores a plurality of user patterns containing a classification pattern as a pair of input information that is input based on an input operation related to a predetermined setting item and one among a plurality of operation results that may be selected as a result of the input operation, for each of the plurality of pieces of input information that are mutually different; an operation result information input unit to which is input operation result information related to operation results selected by the user with regard to each of the one or more input operations previously performed by the user; a pattern specification unit which specifies one user pattern among the plurality of stored user patterns based on the input operation result information; and an operation result selection unit which selects one operation result among a plurality of operation results derived from one of the input operations performed by the user based on the specified one user pattern.

According to the second mode of the present invention, in the information processing device of the first mode, preferably, the pattern specification unit calculates a concordance rate of each of the stored plurality of user patterns and the input operation result information, and specifies the one user pattern with a highest concordance rate.

According to the third mode of the present invention, in the information processing device of the second mode, preferably, at least one among the plurality of user patterns stored in the pattern storage unit is the user pattern in which a concordance rate becomes highest regarding two or more of the users.

According to the fourth mode of the present invention, in the information processing device of the third mode, preferably, the information processing device further comprises a pattern creation unit which, when the user pattern in which a concordance rate with the input operation result information is equal to or greater than a predetermined threshold is not stored in the pattern storage unit, creates a new user pattern in which a concordance rate with the operation result information is equal to or greater than the predetermined threshold and stores the created new user pattern in the pattern storage unit.

According to the fifth mode of the present invention, in the information processing device of the fourth mode, preferably, each of the plurality of user patterns includes rate of use information indicating a rate of the users who input the operation result information in which a concordance rate regarding the user pattern becomes highest among all of the users, and the pattern specification unit specifies the one user pattern among the plurality of user patterns based on the rate of use information when there are a plurality of the user patterns in which a concordance rate is highest regarding the users.

According to the sixth mode of the present invention, in the information processing device of the fifth mode, preferably, each of the plurality of classification patterns included in the user pattern includes a selection frequency of the classification pattern, and the pattern specification unit calculates the concordance rate which reflects the selection frequency. According to the seventh mode of the present invention, in the information processing device of the sixth mode, preferably, each of the plurality of classification patterns included in the user pattern includes a condition that is associated with the classification pattern, the operation result information including information related to the condition is input to the operation result information input unit, and the pattern specification unit calculates the concordance rate which reflects the condition.

According to the eighth mode of the present invention, the information presenting system comprises a server equipped with the information processing device according to any one of the first to seventh modes described above, and a client which is communicable with the server, wherein the client inputs, to the server, the operation result information and the input information related to the one input operation performed by the user, and wherein the server outputs, to the client, the one operation result selected by the operation result selection unit.

According to the present invention, a proper operation result can be selected for a user even when the user's operation history is minimal.

BRIEF DESCRIPTION OF THE FIGURES

FIG. 6 is a diagram schematically showing the data structure of the classification pattern DB 48.

FIG. 8 is a diagram schematically showing the data structure of the destination history information 310.

FIG. 9a and FIG. 9b are explanatory diagrams of a method for specifying the user pattern 490.

FIG. 11 is a flowchart of the user pattern specification processing that is called from step S50 of FIG. 10a.

DESCRIPTION OF EMBODIMENTS

Figure 1:
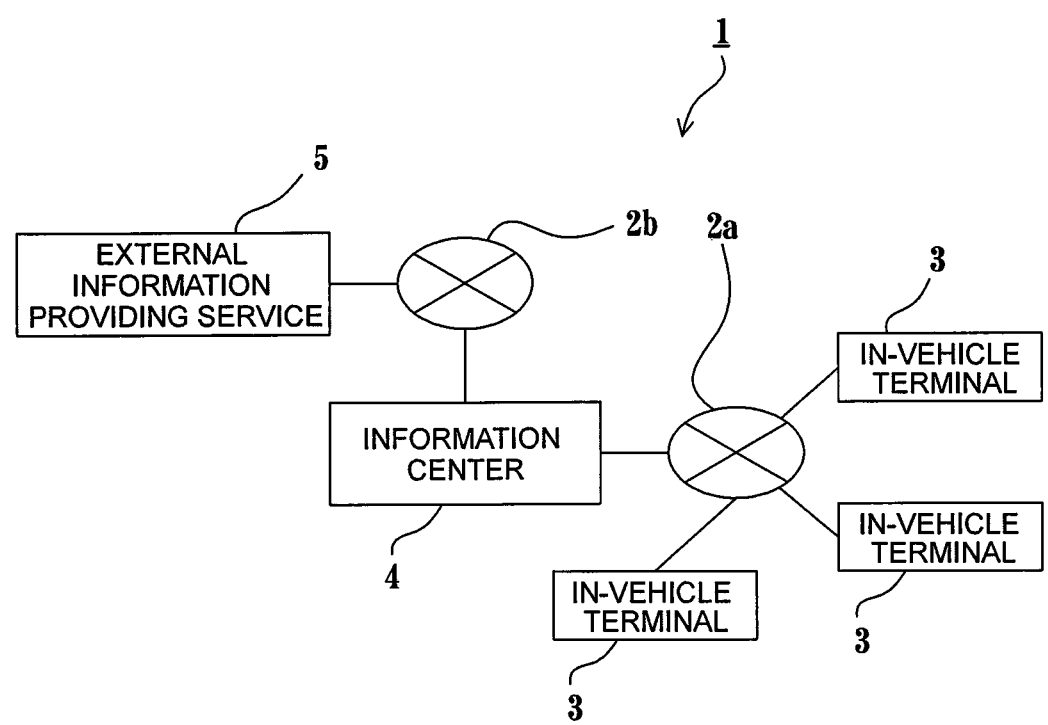
FIG. 1 is a block diagram schematically showing a configuration of the information presenting system 1 according to the first embodiment.

FIG. 1 is a block diagram schematically showing a configuration of the information presenting system 1 according to the first embodiment. The information presenting system 1 includes an in-vehicle terminal 3, an information center 4, and an external information providing service 5. The in-vehicle terminal 3 is, for instance, a car navigation system that is installed in a vehicle. The information center 4 and the external information providing service 5 are, for instance, information processing devices such as servers installed in a data center.

The in-vehicle terminal 3 and the information center 4 are mutually connected via a network 2a. The information center 4 and the external information providing service 5 are mutually connected via a network 2b. Note that, while the network 2a and the network 2b are illustrated as different networks in FIG. 1, the network 2a and the network 2b may also be a single (the same) network.

Figure 2:
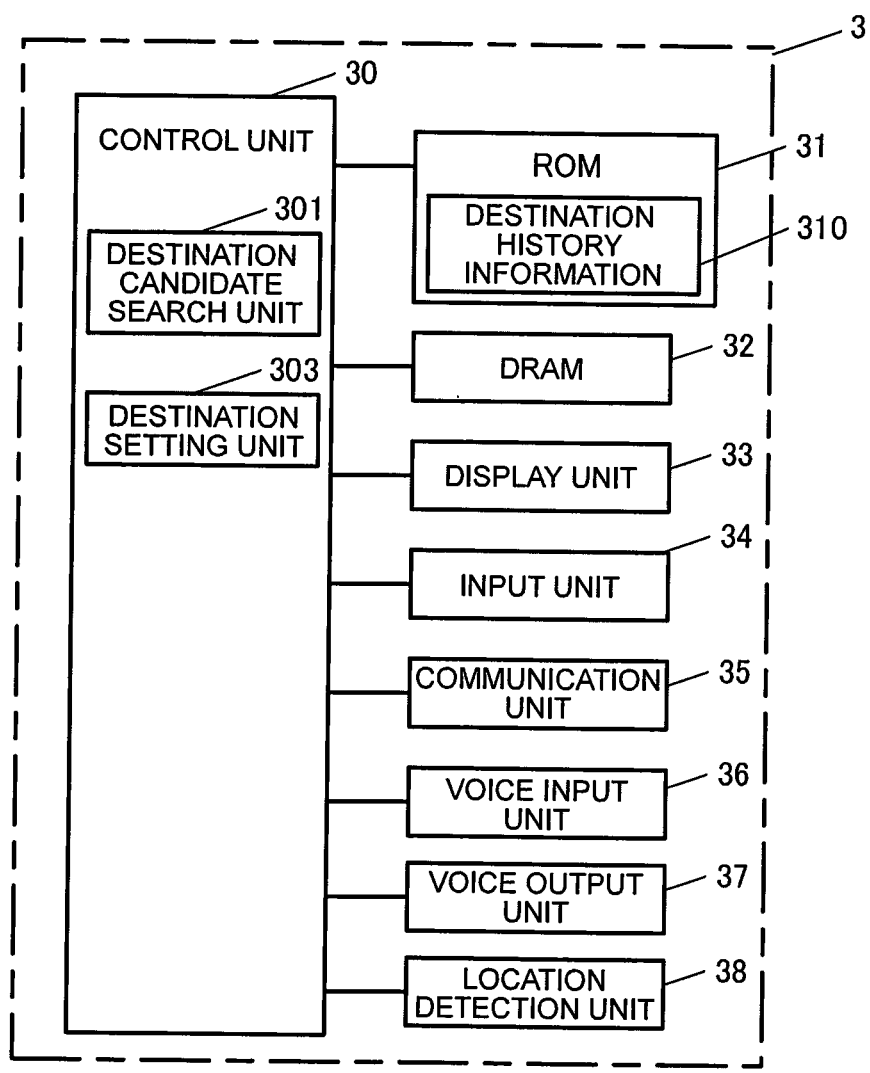
FIG. 2 is a block diagram schematically showing a configuration of the in-vehicle terminal 3.

FIG. 2 is a block diagram schematically showing a configuration of the in-vehicle terminal 3. The in-vehicle terminal 3 comprises a control unit 30, a ROM 31, a DRAM 32, a display unit 33, an input unit 34, a communication unit 35, a voice input unit 36, a voice output unit 37, and a location detection unit 38.

The control unit 30 is configured from a CPU (not shown) and a peripheral circuit thereof. The ROM 31 is, for instance, a non-volatile storage medium such as a flash memory. Predetermined control programs are stored in advance in the ROM 31. The control unit 30 controls the in-vehicle terminal 3 by reading the control programs from the ROM 31 and executing the read control programs. The ROM 31 additionally stores destination history information 310 (described later). The DRAM 32 is a temporary storage medium. The control unit 30 uses the DRAM 32 as a storage area for work.

The display unit 33 is, for instance, a display device such as an LCD monitor. The control unit 30 display various images and texts on the display unit 33. The input unit 34 is, for instance, an input device such as a touch panel. The communication unit 35 performs data communication with the information center 4 via the network 2a. The voice input unit 36 is, for instance, an input device such as a microphone. The voice input unit 36 inputs the user's voice as voice data to the control unit 30. The voice output unit 37 is, for instance, an output device such as a speaker. The location detection unit 38 detects the location of the vehicle equipped with the in-vehicle terminal 3 (hereinafter referred to as the "host vehicle"), for instance, by using a positioning system such as a GPS.

The control unit 30 includes a destination candidate search unit 301 and a destination setting unit 303. The destination candidate search unit 301 and the destination setting unit 303 are software-like functional parts that are realized by the control unit 30 executing the control programs. Note that each of these functional parts may also be configured from an electronic circuit.

The destination candidate search unit 301 sends the search information and the destination history information 310 to the information center 4, and receives the corresponding search result information and recommendation information from the information center 4. The search information is, for instance, voice data representing a search phrase to be used for searching for a facility or a spot (these are hereinafter simply referred to as the "facility") to become destination candidates such as "coffee shop" or "gas station with a car wash". Note that, instead of voice data, data of text or the like may also be used as the search information. The destination history information 310 will be described later. The search result information is information representing the facilities which coincide with the search information. The recommendation information is information representing the facilities that are recommended as the user's destination candidates which are selected by the information center 4 based on the processing described later. In other words, the destination candidate search unit 301 searches for the facilities to become the destination candidates by using the information center 4.

The destination setting unit 303 sets, as the destination of the route guide, the facility selected by the user among the facilities included in the search result information and the recommendation information. The control unit 30 searches for the route to the destination set by the destination setting unit 303 from the current location of the host vehicle detected by the location detection unit 38. The control unit 30 presents the route guide to the user based on the searched route.

Figure 3:
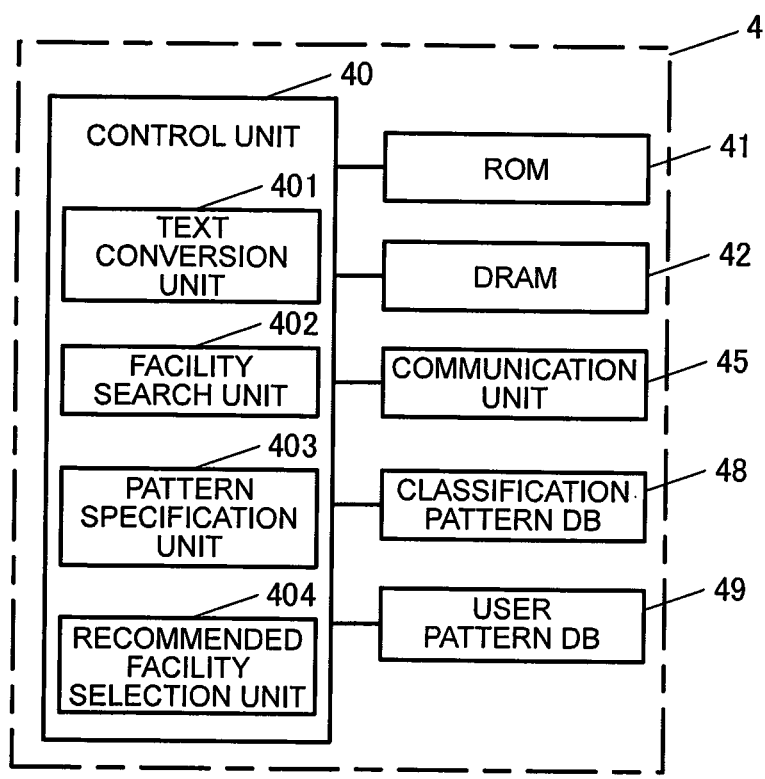
FIG. 3 is a block diagram schematically showing a configuration of the information center 4.

FIG. 3 is a block diagram schematically showing a configuration of the information center 4. The information center 4 comprises a control unit 40, a ROM 41, a DRAM 42, a communication unit 45, a classification pattern database (DB) 48, and a user pattern database (DB) 49.

The control unit 40 is configured from a CPU (not shown) and a peripheral circuit thereof. The ROM 41 is, for instance, a non-volatile storage medium such as a flash memory. Predetermined control programs are stored in advance in the ROM 41. The control unit 40 controls the information center 4 by reading the control programs from the ROM 41 and executing the read control programs. The DRAM 42 is a temporary storage medium. The control unit 40 uses the DRAM 42 as a storage area for work.

The communication unit 45 performs data communication with the in-vehicle terminal 3 via the network 2a, and additionally performs data communication with the external information providing service 5 via the network 2b. The classification pattern DB 48 stores the classification patterns described later. The user pattern DB 49 stores the user patterns described later.

The control unit 40 includes a text conversion unit 401, a facility search unit 402, a pattern specification unit 403, and a recommended facility selection unit 404. The text conversion unit 401, the facility search unit 402, the pattern specification unit 403, and the recommended facility selection unit 404 are software-like functional parts that are realized by the control unit 40 executing the control programs. Note that each of these functional parts may also be configured from an electronic circuit.

The text conversion unit 401 converts search information, which is voice data sent from the in-vehicle terminal 3, into text data. The facility search unit 402 sends the converted text data to the external information providing service 5, and receives information of the corresponding facilities from the external information providing service 5. In other words, the facility search unit 402 searches for the facilities based on the search information. The pattern specification unit 403 specifies one user pattern among a plurality of user patterns (described later) stored in the user pattern DB 49 based on the destination history information 310 (described later) sent from the in-vehicle terminal 3. The recommended facility selection unit 404 selects the facilities to be recommended as the user's destination based on the specified one user pattern and the search information sent from the in-vehicle terminal 3.

Figure 4:
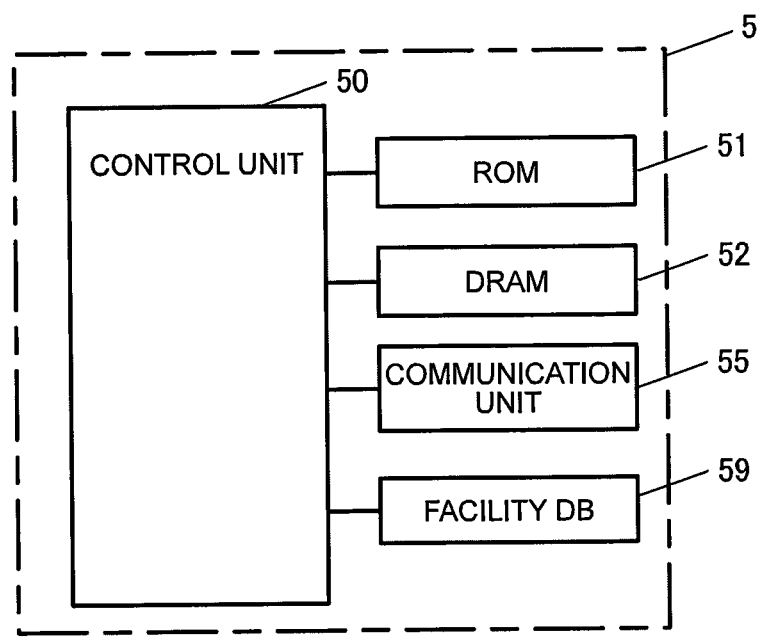
FIG. 4 is a block diagram schematically showing a configuration of the external information providing service 5.

FIG. 4 is a block diagram schematically showing a configuration of the external information providing service 5. The external information providing service 5 comprises a control unit 50, a ROM 51, a DRAM 52, a communication unit 55, and a facility database (DB) 59.

The control unit 50 is configured from a CPU (not shown) and a peripheral circuit thereof. The ROM 51 is, for instance, a non-volatile storage medium such as a flash memory. Predetermined control programs are stored in advance in the ROM 51. The control unit 50 controls the external information providing service 5 by reading the control programs from the ROM 51 and executing the read control programs. The DRAM 52 is a temporary storage medium. The control unit 50 uses the DRAM 52 as a storage area for work.

The communication unit 55 performs data communication with the information center 4 via the network 2*b*. The facility DB 59 stores information of facilities that can be designated as the user's destination. For example, name, location, category, incidental facilities, explanatory notes and other information are stored for each facility.

Note that, in the foregoing explanation, while the information center 4 and the external information providing service 5 were illustrated as different devices that are mutually connected via the network 2*b*, the information center 4 and the external information providing service 5 may also be configured as a single device.

The recommendation information presenting function equipped in the information presenting system 1 is now explained. As described above, the in-vehicle terminal 3 is a so-called car navigation device, and has a navigation function of offering route guidance to the user. Upon using the navigation function, the user is required to operate the in-vehicle terminal 3 and input the destination facility. The recommendation information presenting function is a function for supporting the input of the destination facility.

The procedures to be performed by the user for inputting the destination are as follows. When the user vocalizes a search keyword such as "coffee shop" or "gas station" for specifying the destination facility, the voice data of the vocalized content is input from the voice input unit 36 to the control unit 30. The control unit 30 sends the input voice data as the search information to the information center 4, and additionally sends the user pattern information described later to the information center 4. The information center 4 sends the information of the facilities specified based on the search information as the search result information to the in-vehicle terminal 3, and additionally sends the information of the facilities specified based on the user pattern information to the in-vehicle terminal 3. The control unit 30 displays the information of the facilities included in the received search result information and recommendation information on the display unit 33. The user designates one of the displayed facilities as the destination by using the input unit 34 or the like.

Figure 5:
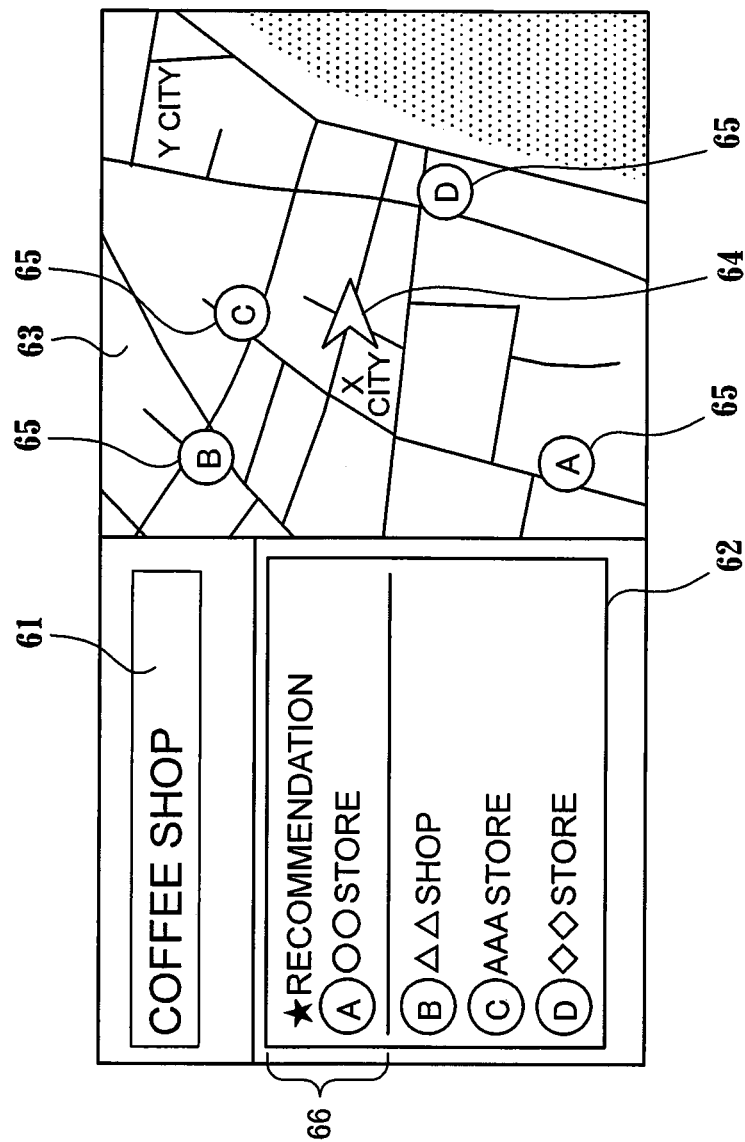
FIG. 5 is a diagram showing an example of a screen displaying search result information and recommendation information.

FIG. 5 is a diagram showing an example of a screen displaying search result information and recommendation information. The search information input by the user such as "coffee shop" is displayed in a search column 61 at the upper part of the screen. The facilities included in the search result information and the recommendation information (that is, a list of destination candidates) are displayed in a display area 62 at the bottom of the screen. A map 63 is displayed on the right side of the screen. The control unit 30 displays an icon 64 representing the current location of the host vehicle and icons 65 representing the locations of the destination candidates by superimposing these icons on the map 63. The facility included in the recommendation information; that is, the destination candidate selected by the information center, is displayed as the facility recommended for the user in an uppermost part 66 of the display area 62.

As described above, the function of the information center 4 selecting the facilities to be recommended to the user as the destination candidate and the in-vehicle terminal 3 presenting such selected facilities is the recommendation information presenting function. The data structure and processing required for the recommendation information presenting function are now explained.

FIG. 6 is a diagram schematically showing the data structure of the classification pattern DB 48. The classification pattern DB 48 stores a plurality of classification patterns 480. The classification patterns 480 include classification information 481, name information 482, and service information 483. The classification pattern 480 is a pair of the classification information 481 that is input as the destination setting operation related to the destination setting, and one among a plurality of facilities that may be selected as a result of the destination setting operation. The name information 482 and the service information 483 are respectively information representing the conditions which are satisfied by the facilities that may be selected as the destination. The name information 482 and the service information 483 are also associated with frequency information 484.

The classification information 481 is, for instance, information representing the classification of the facility such as coffee shop, gas station or the like. The name information 482 is information representing the name of the facility. The service information 483 is information representing the services offered by the facility. The frequency information 484 is information representing the frequency that the user has selected the facility corresponding to the name information 482 and the service information 483.

For example, considered is the classification pattern 480 in which the classification information 481 of "coffee shop", the name information 482 of "○○ shop", and the service information 483 of "drive-through" are associated. Let it be assumed that the frequency information 484 of "60%" is associated with the name information 482, and the frequency information 484 of "30%" is associated with the service information 483. The meaning of this classification pattern 480 is as follows. When a user corresponding to this classification pattern 480 searches for a destination based on the search information including the classification information 481 of "coffee shop", the user selects the name of "○○ shop" as the destination at a frequency of 60%. Similarly, when this user searches for a destination based on the search information including the classification information 481 of "coffee shop", the user selects a destination that offers the service of "drive-through" at a frequency of 30%.

The classification pattern DB 48 stores numerous classification patterns 480 configured as described above based on combinations in which at least one among the classification information 481, the name information 482, the service information 483, and the frequency information 484 is different. For example, there may be cases where two classification patterns 480 that have the same name information 482 and service information 483, but have different frequency information 484, are stored.

Figure 7:
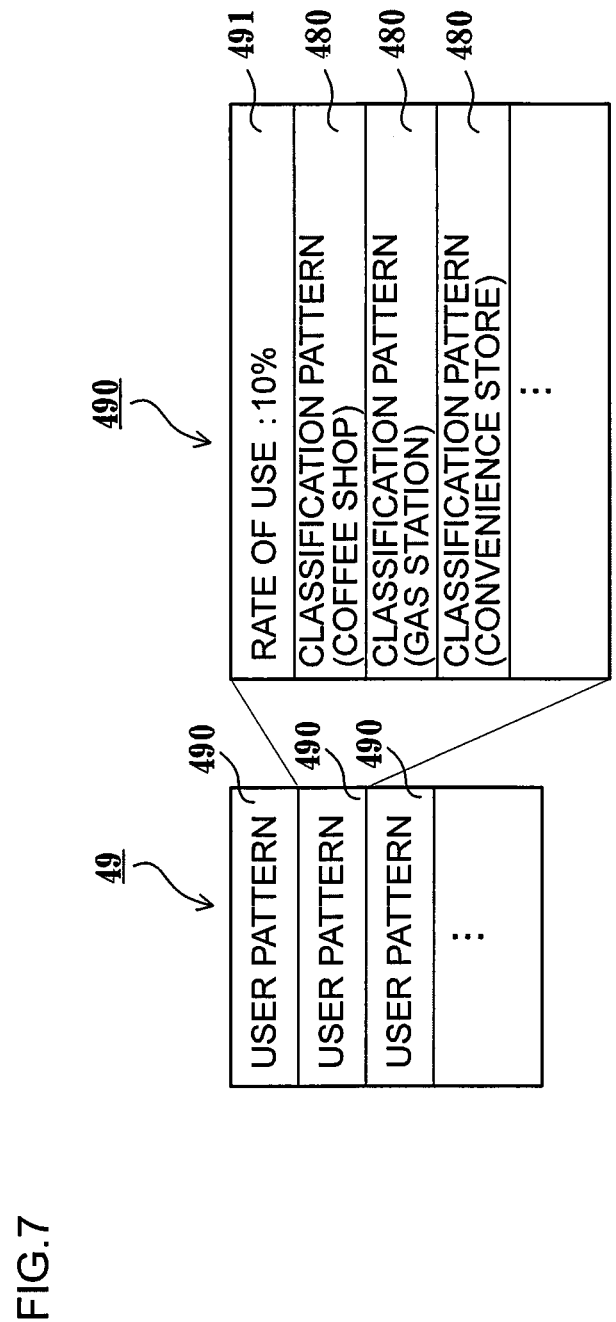
FIG. 7 is a diagram schematically showing the data structure of the user pattern DB 49.

FIG. 7 is a diagram schematically showing the data structure of the user pattern DB 49. The user pattern DB 49 stores a plurality of user patterns 490. The user pattern 490 is information including the classification pattern 480 for each of the plurality of pieces of classification information 481 that are mutually different. The user patterns 490 respectively represent the type of the user's preference. Each user pattern 490 corresponds to an unspecified number of users. In other words, one user pattern 490 does not correspond to one user.

The user pattern 490 includes rate of use information 491, and information which specifies a plurality of classification patterns 480. Note that, while FIG. 7 is schematically illustrated as though each user pattern 490 includes (has) a classification pattern 480, in effect the classification pattern 480 is included in the classification pattern DB 48 shown in FIG. 6. Instead, each user pattern 490 includes information for specifying the individual classification patterns 480 included in the classification pattern DB 48 (for instance, a unique number for each classification pattern 480). In the ensuing explanation also, for the sake of simplification, the explanation will be provided as though each user pattern 490 includes (has) a classification pattern 480.

The rate of use information 491 is information representing the rate of the number of users corresponding to the relevant user pattern 490 among the total number of users. For example, when the total number of users using this system is 100 users and the number of users corresponding to a certain user pattern 490 is 30 users, the rate of use information 491 included in that user pattern 490 will be "30%".

The plurality of classification patterns 480 included in one user pattern 490 each correspond to different classification information 481. To put it differently, the one user pattern 490 includes a classification pattern 480 having mutually different classification information 481.

FIG. 8 is a diagram schematically showing the data structure of the destination history information 310. The destination history information 310 is information representing the history of the facilities that were selected by the user as the destination and set as the destination by the destination setting unit 303. To put it differently, the destination history information 310 is information related to the destinations selected by the user regarding one or more destination setting operations previously performed by the user. The destination history information 310 includes, for each destination, classification information 481 of the destination, name information 482 of the destination, and service information 483 of the destination. As described above, the destination setting unit 303 adds new information at the end of the destination history information 310 each time a new destination is selected by the user.

The data structure required for the recommendation information presenting function was described above. The processing required for realizing the recommendation information presenting function is now explained.

Foremost, the information center 4 receives the search information (voice data of the search keyword) for searching for the destination and the destination history information 310 from the in-vehicle terminal 3. In the information center 4, the text conversion unit 401 converts the voice data into text data. The facility search unit 402 sends the converted text data to the external information providing service 5. The external information providing service 5 searches for facility information based on the text data. For example, when the text data is "coffee shop with a drive-through", the external information providing service 5 searches for facilities containing both the phrases "drive-through" and "coffee shop" in the explanatory note. The external information providing service 5 sends the search result (that is, information of facilities that coincide with the text data) to the information center 4.

Next, the pattern specification unit 403 uses the destination history information 310 received from the in-vehicle terminal 3 and specifies one user pattern 490 corresponding to the user of the in-vehicle terminal 3 from the user pattern DB 49. To put it differently, the pattern specification unit 403 specifies the user pattern 490 which most corresponds to the destination history information 310 of the user who voiced the search keyword among the plurality of user patterns 490 which are prepared in advance as the user's type.

The method of specifying the one user pattern 490 corresponding to the user of the in-vehicle terminal 3 will be described in detail later. The pattern specification unit 403 foremost tabulates the destination history information 310 for each piece of classification information 481.

FIG. 9a and FIG. 9b are explanatory diagrams of a method for specifying the user pattern 490. FIG. 9a is a diagram showing an example of the result of tabulating the destination history information 310 for the classification information 481 of "gas station". As shown in FIG. 9a, the pattern specification unit 403 tabulates the number of times that all of the destinations in the destination history information 310 corresponding to the classification information 481 of "gas station" have been set as the destination based on the name information 482 and the service information 483. In FIG. 9a, a gas station named "○○ chain" has been set as the destination a total of 150 times. Moreover, among those 150 times, the user set "○○ chain" which offers the service of "self-service gas station" as the destination 50 times, and set "○○ chain" which offers the service of "car wash" as the destination for the remaining 100 times. Similarly, a gas station named "AAA gas station" has been set as the destination a total of 50 times. Among those 50 times, the user set "AAA gas station" which offers the service of "self-service gas station" as the destination 20 times, and set "AAA gas station" which offers the service of "car wash" as the destination for the remaining 30 times.

The pattern specification unit 403 compares the result of tabulating the "AAA gas station" for "gas station" shown in FIG. 9a with the respective classification patterns 480 for "gas station" in the classification pattern DB 48. Based on the foregoing comparison, the pattern specification unit 403 calculates the similarity rate with the destination history information 310 regarding the respective classification patterns 480 for "gas station".

FIG. 9b is a diagram showing an example of the classification pattern 480 for "gas station" in the classification pattern DB 48. Here, let it be assumed that two classification patterns 480 related to "gas station"; specifically, a classification pattern 480a and a classification pattern 480b, exist. With the classification pattern 480a, the name information 482 is "○○ chain" and the service information 483 is "self-service gas station". With the classification pattern 480a, the frequency information 484 associated with the name information 482 is "80%", and the frequency information 484 associated with the service information 483 is "60%". With the classification pattern 480b, the name information 482 is "AAA gas station" and the service information 483 is "car wash". With the classification pattern 480b, the frequency information 484 associated with the name information 482 is "60%", and the frequency information 484 associated with the service information 483 is "50%".

The pattern specification unit 403 calculates the similarity rate between the destination history information 310 and the classification pattern 480 according to the following formulas (1) to (4).

$$d1 = 100 - |\text{difference of frequency information 484 of name information 482}| \quad (1)$$

$$d2 = 100 - |\text{difference of frequency information 484 of service information 483}| \quad (2)$$

$$d3 = \text{setting frequency in destination history information 310} \quad (3)$$

$$\text{similarity rate} = (d1 + d2 + d3)/3 \quad (4)$$

For example, considered is the similarity rate between the destination history information 310 illustrated in FIG. 9a and the classification pattern 480a illustrated in FIG. 9b. Based on FIG. 9a, because the frequency that "∘∘ chain" is set as the destination is 150 times out of 200 times, the result is 75%. Based on FIG. 9b, the frequency information 484 associated with the name information 482 of the classification pattern 480a is 80%. Accordingly, d1 will be 100−|75−80|=95%. Based on FIG. 9a, because the frequency that "self-service gas station" is set as the destination is 70 times out of 200 times, the result is 35%. Based on FIG. 9b, the frequency information 484 associated with the service information 483 of the classification pattern 480a is 60%. Accordingly, d2 will be 100−β5−60|=75%. Based on FIG. 9a, because the frequency that the combination of "∘∘ chain" and "self-service gas station" is set as the destination is 50 times out of 200 times, the result is 25%. Accordingly, d3=25%. Based on the above, the similarity rate between the destination history information 310 and the classification pattern 480a is (95%+75%+25%)/3=65%.

Similarly, considered is the similarity rate between the destination history information 310 illustrated in FIG. 9a and the classification pattern 480b illustrated in FIG. 9b. Based on FIG. 9a, because the frequency that "AAA gas station" is set as the destination is 50 times out of 200 times, the result is 25%. Based on FIG. 9b, the frequency information 484 associated with the name information 482 of the classification pattern 480a is 60%. Accordingly, d1 will be 100−125−60|=65%. Based on FIG. 9a, because the frequency that "car wash" is set as the destination is 130 times out of 200 times, the result is 65%. Based on FIG. 9b, the frequency information 484 associated with the service information 483 of the classification pattern 480a is 50%. Accordingly, d2 will be 100−|65−50|=85%. Based on FIG. 9a, the frequency that the combination of "AAA gas station" and "car wash" is set as the destination is 30 times out of 200 times, the result is 15%. Accordingly, d3=15%. Based on the above, the similarity rate between the destination history information 310 and the classification pattern 480b is (65%+85%+15%)/3=55%.

The pattern specification unit 403 selects, as the classification pattern 480 which represents "gas station", the classification pattern 480a having the highest similarity rate regarding "gas station". The pattern specification unit 403 repeatedly executes the foregoing processing for each piece of classification information 481. Consequently, a classification pattern 480 which represents each piece of classification information 481 is selected one by one.

The pattern specification unit 403 compares the aggregation of the classification patterns 480 which respectively represent each piece of classification information 481, and the respective user patterns 490 in the user pattern DB 49. Upon performing this comparison, the pattern specification unit 403 calculates a numerical value referred to as the concordance rate for each user pattern 490. The concordance rate is the rate of the total number of classification patterns 480 included in the user pattern 490 and the number of classification patterns 480 which respectively represent each piece of classification information 481 included in the user pattern 490. For example, when all classification patterns 480 which respectively represent each piece of classification information 481 are included in a certain user pattern 490, and no other classification pattern 480 is included in that user pattern 490, the concordance rate will be 100%. Moreover, let it be assumed that a certain user pattern 490 has a classification pattern 480 related to "gas station" and a classification pattern 480 related to "coffee shop". Let it be further assumed that the classification patterns 480 which respectively represent each piece of classification information 481 are also similarly configured from a classification pattern 480 related to "gas station" and a classification pattern 480 related to "coffee shop". Here, when only one of the classification patterns 480 mutually coincide, the concordance rate will be 50%.

The pattern specification unit 403 specifies the user pattern 490 with the highest concordance rate as the user pattern 490 which best represents the user's characteristics (which best coincides with the user's characteristics). Among the search results (that is, information of facilities that coincide with the text data) received from the external information providing service 5, the recommended facility selection unit 404 selects the facilities which coincide with the specified user pattern 490 as the facilities to be recommended to the user. For example, explained is a case where the user inputs the search information of "gas station". Here, the recommended facility selection unit 404 specifies the classification pattern 480 having the classification information 481 of "gas station" from the specified user pattern 490. The recommended facility selection unit 404 selects the facilities which coincide with the name information 482 and the service information 483 of the specified classification pattern 480 as the facilities to be recommended to the user.

Note that, when there are a plurality of user patterns 490 having the highest concordance rate, the pattern specification unit 403 selects the user pattern 490 having the highest rate of use information 491. Moreover, when there are a plurality of user patterns 490 having the highest rate of use information 491, one among the plurality of user patterns 490 is selected at random.

The method of the pattern specification unit 403 creating the classification pattern 480 is now explained. As explained above, the pattern specification unit 403 selects the classification pattern 480a having the highest similarity rate regarding "gas station" as the classification pattern 480 which represents "gas station". When all of the classification patterns 480 included in the classification pattern DB 48 only have a similarity rate which is equal to or less than a predetermined threshold, the pattern specification unit 403 creates a new classification pattern 480 having a higher similarity rate and stores the new classification pattern 480 in the classification pattern DB 48.

The pattern specification unit 403 sets, as the new classification pattern 480, a combination of the name information 482 and the service information 483 which were set the most number of times as the destination in the destination history information 310. For example, when the destination history information 310 is of the subject matter illustrated in FIG. 9a, with the newly set classification pattern 480, the classification information 481 is "gas station", the name information 482 is "∘∘ chain", and the service information 483 is "car wash". Moreover, the frequency information 484 associated with name information 482 is "75%", and the frequency information 484 associated with the service information 483 is "65%".

The threshold of the similarity rate is desirably 66.6% (⅓) or less. This is because, when the threshold is too high, the similarity rate with the newly created classification pattern 480 will be equal to or less than the threshold.

Note that when there are a plurality of combinations of the name information 482 and the service information 483 which were set the most number of times as the destination, the pattern specification unit 403 selects the combination in which the total value of the number of times that the name information 482 was selected and the number of times that the service information 483 was selected will become the greatest. Moreover, when there are a plurality of combinations in which the total value becomes the same, one combination is selected randomly from the plurality of combinations.

The method of the pattern specification unit 403 creating the user pattern 490 is now explained. When the concordance rate calculated for each user pattern 490 in the user pattern DB 49 is equal to or less than a predetermined threshold, the pattern specification unit 403 creates a new user pattern 490 having a higher concordance rate and stores the new user pattern 490 in the user pattern DB 49.

The pattern specification unit 403 creates the new user pattern 490 based on the user pattern 490 having the highest concordance rate. The pattern specification unit 403 sets, as the new user pattern 490, one classification pattern 480 among the classification patterns 480 included in the user pattern 490 as the basis replaced with at least one classification pattern 480 which represents each piece of classification information 481. For example, the classification pattern 480 for "gas station" as the basis included in the user pattern 490 replaced with the classification pattern 480 which represents "gas station" is used as the new user pattern 490.

The pattern specification unit 403 stores, in the classification pattern DB 48, the classification pattern 480 among the classification patterns 480 included in the newly created user pattern 490 which is not stored in the classification pattern DB 48.

When there are a plurality of user patterns 490 having the highest concordance rate, the pattern specification unit 403 selects the user pattern 490 having the latest rate of use information 491. Moreover, when there are a plurality of user patterns 490 having the highest rate of use information 491, one user pattern 490 is randomly selected from the plurality of user patterns 490.

Figures 10A, 10B:
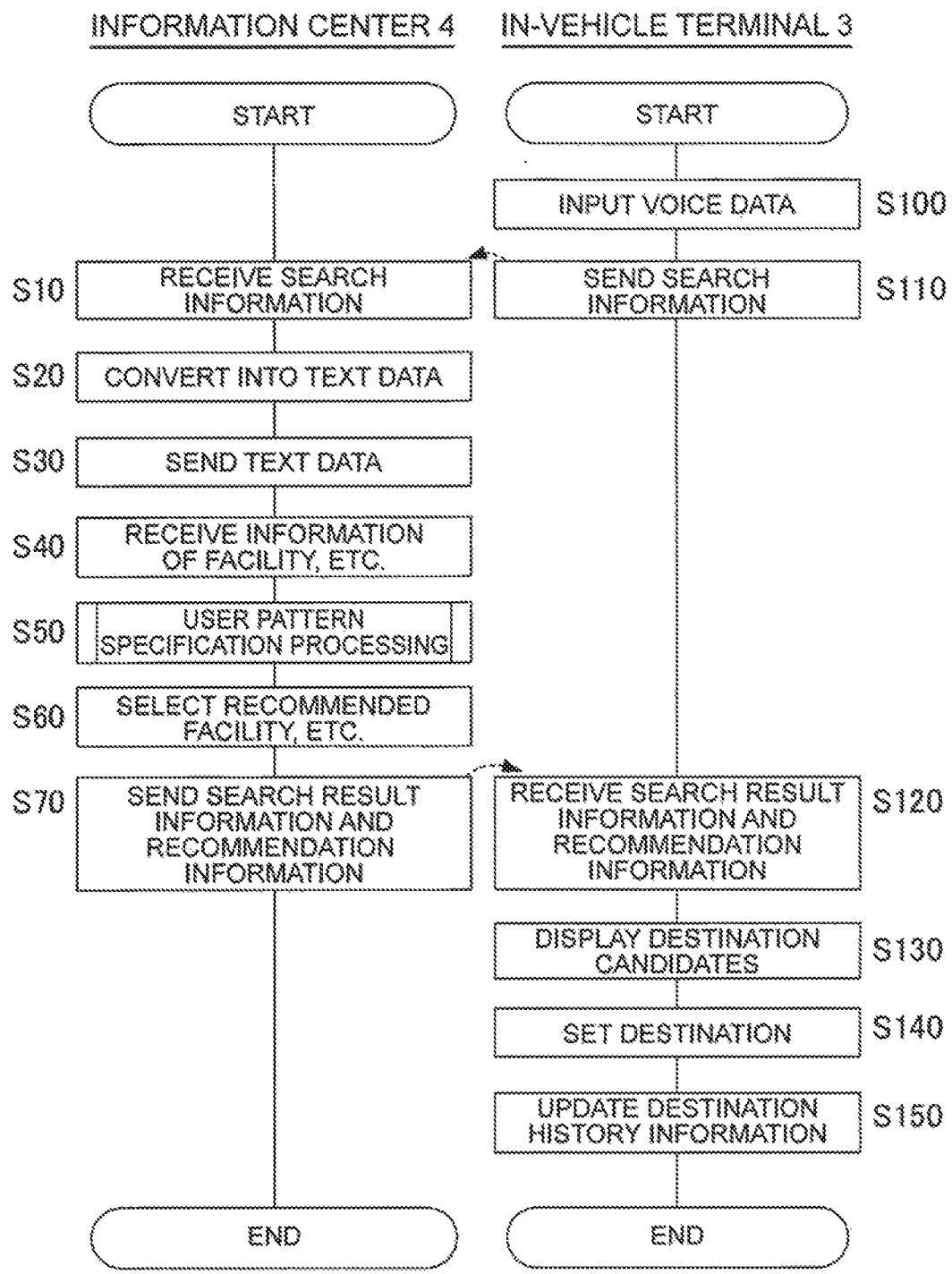
FIG. 10a and FIG. 10b are flowcharts of the destination setting processing.

FIG. 10a and FIG. 10b are flowcharts of the destination setting processing. FIG. 10a is processing to be executed by the information center 4. FIG. 10b is processing to be executed by the in-vehicle terminal 3.

The processing illustrated in FIG. 10a to be executed by the information center 4 is now explained. In step S10, the communication unit 45 receives search information (voice data of the search keyword) sent from the in-vehicle terminal 3. In step S20, the text conversion unit 401 converts the search information into text data. In step S30, the facility search unit 402 sends the text data of the search keyword to the external information providing service 5. In step S40, the facility search unit 402 receives information of facilities which coincide with the search keyword from the external information providing service 5. In step S50, the pattern specification unit 403 executes the user pattern specification processing described later. Based on this processing, the one user pattern 490 corresponding to the user of the in-vehicle terminal 3 is specified. In step S60, the recommended facility selection unit 404 selects the facilities to be recommended by extracting the classification patterns 480 corresponding to the text data of the search keyword from the specified one user pattern 490. In step S70, the communication unit 45 sends the search result information (information of the facilities received in step S40) and the recommendation information (information of the facilities selected in step S60) to the in-vehicle terminal 3.

The processing illustrated in FIG. 10b to be executed by the in-vehicle terminal 3 is now explained. In step S100, the voice input unit 36 inputs the search keyword that was voiced by the user, as the voice data, in the control unit 30. In step S110, the destination candidate search unit 301 sends the search information (voice data of the search keyword) to the information center 4. In step S120, the destination candidate search unit 301 receives the search result information and the recommendation information from the information center 4. In step S130, the display unit 33 displays the search result information and the recommendation information are displayed as illustrated in FIG. 5. In step S140, the destination setting unit 303 sets the destination based on the user's instruction input via the input unit 34, etc. In step S150, the destination setting unit 303 updates the destination history information 310 in the ROM 31.

Figure 11:
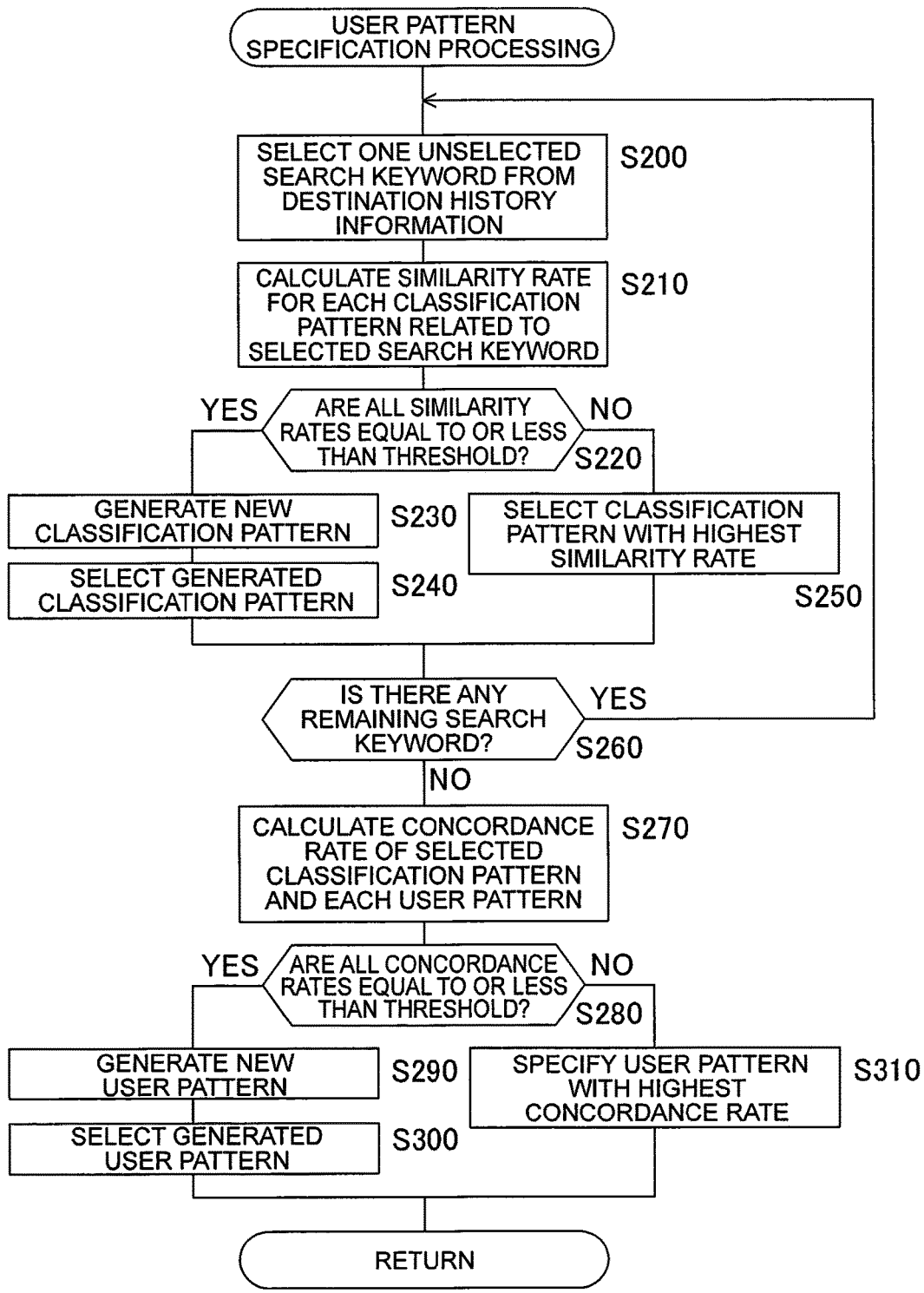

FIG. 11 is a flowchart of the user pattern specification processing that is called from step S50 of FIG. 10a. In step S200, the pattern specification unit 403 selects one unselected classification information 481 among the classification information 481 included in the destination history information 310 received from the in-vehicle terminal 3. In step S210, the pattern specification unit 403 calculates the similarity rate of the destination history information 310, according to the foregoing procedures, with regard to the respective classification patterns 480 related to the classification information 481 selected in step S200 among the classification patterns 480 stored in the classification pattern DB 48.

In step S220, the pattern specification unit 403 determines whether all of the similarity rates calculated in step S210 are equal to or less than a predetermined threshold. When all similarity rates are equal to or less than a predetermined threshold, the pattern specification unit 403 proceeds to the processing of step S230. In step S230, the pattern specification unit 403 creates the new classification pattern 480 and stores the new classification pattern 480 in the classification pattern DB 48 according to the foregoing procedures. In step S240, the pattern specification unit 403 selects the new classification pattern 480 created in step S230. Subsequently, the pattern specification unit 403 advances the processing to step S260. Meanwhile, upon obtaining a negative determination in step S220, the pattern specification unit 403 advances the processing to step S250. In step S250, the pattern specification unit 403 selects the classification pattern 480 with the highest similarity rate. The pattern specification unit 403 thereafter advances the processing to step S260.

In step S260, the pattern specification unit 403 determines whether there is any unselected classification information 481 included in the destination history information 310. If there is any unselected classification information 481, the pattern specification unit 403 advances the processing to step S200. Meanwhile, when all classification information 481 have been selected, the pattern specification unit 403 advances the processing to step S270.

In step S270, the pattern specification unit 403 calculates the concordance rate, according to the foregoing procedures, between the classification pattern 480 selected for each classification information 481 one by one, and the respective user patterns 490 stored in the user pattern DB 49. In step S280, the pattern specification unit 403 determines whether all of the calculated concordance rates are equal to or less than a predetermined threshold. When all of the concordance rates are equal to or less than a predetermined threshold, the pattern specification unit 403 advances the processing to step S290. In step S290, the pattern specification unit 403 creates a new user pattern 290 and stores the new user pattern 290 in the user pattern DB 49 based on the foregoing procedures. In step S300, the pattern specification unit 403 selects the new user pattern 490 created in step S290. The pattern specification unit 403 thereafter ends the user pattern specification processing shown in FIG. 11. Meanwhile, when a negative determination is obtained in step S280, the pattern specification unit 403 advances the processing to step S310. In step S310, the pattern specification unit 403 specifies the user pattern 490 with the highest concordance rate as the user pattern 490 that is appropriate for the user. The pattern specification unit 403 thereafter ends the user pattern specification processing shown in FIG. 11.

According to the foregoing embodiments, the following effects are yielded.

(1) A user pattern DB 49 stores a plurality of user patterns 490 containing a classification pattern 480 as a pair of classification information 481 (input information) that is input based on a destination setting operation (input operation) related to a destination setting and one among a plurality of facilities (operation results) that may be selected as a result of the destination setting operation, for each of the plurality of pieces of classification information 481 that are mutually different. The communication unit 45 functions as an operation result information input unit to which is input destination history information 310 (operation result information) related to facilities selected by the user with regard to each of the one or more destination setting operations previously performed by the user. The pattern specification unit 403 specifies one user pattern 490 among the plurality of stored user patterns 490 based on the input destination history information 310. The recommended facility selection unit 404 functions as an operation result selection unit which selects one facility among a plurality of facilities derived from one of the destination setting operations performed by the user based on the specified one user pattern 490. As a result of adopting the foregoing configuration, a proper operation result can be selected for a user even when the user's operation history is minimal. For example, even when the user has set the destination only once and information regarding one destination is only included in the destination history information 310, it is possible to present recommendation information based one of the user patterns 490 to the user.

(2) The pattern specification unit 403 calculates a concordance rate of each of the stored plurality of user patterns 490 and the input destination history information 310, and specifies the one user pattern 490 with a highest concordance rate. As a result of adopting the foregoing configuration, it is possible to select a proper operation result based on the user pattern 490 which best represents the user's characteristics.

(3) At least one among the plurality of user patterns 490 stored in the user pattern DB is the user pattern 490 in which a concordance rate becomes highest regarding two or more of the users. As a result of adopting the foregoing configuration, even when the user's operation history is minimal, it is possible to select a proper operation result for the user. Moreover, the data volume can be reduced in comparison to cases of managing the user's preference for each user.

(4) The pattern specification unit 403 functions as a pattern creation unit which, when the user pattern 490 in which a concordance rate with the input destination history information 310 is equal to or greater than a predetermined threshold is not stored in the user pattern DB 49, creates a new user pattern 490 in which a concordance rate with the destination history information 310 is equal to or greater than the predetermined threshold and stores the created new user pattern 490 in the user pattern DB 49. As a result of adopting the foregoing configuration, the user pattern 490 is automatically created as needed as though the system is growing, and it is thereby possible to select a more proper operation result.

(5) Each of the plurality of user patterns 490 includes rate of use information indicating a rate of the users who input the destination history information 310 in which a concordance rate regarding the user pattern 490 becomes highest among all of the users. The pattern specification unit 403 specifies the one user pattern 490 among the plurality of user patterns 490 based on the rate of use information 491 when there are a plurality of the user patterns 490 in which a concordance rate is highest regarding the users. As a result of adopting the foregoing configuration, it is possible to select a proper operation result even in cases when there are a plurality of user patterns 490 in which the concordance rate is highest.

(6) Each of the plurality of classification patterns 480 included in the user pattern 490 includes frequency information 484 representing a selection frequency of the classification pattern 480. The pattern specification unit 403 calculates the concordance rate which reflects the frequency information 484. As a result of adopting the foregoing configuration, it is possible to select a more detailed recommended facility based on the frequency.

(7) Each of the plurality of classification patterns 480 included in the user pattern 490 includes name information 482 and service information 483 as conditions that are associated with the classification pattern 480. The destination history information 310 including the name information 482 and the service information 483 is input to the communication unit 45. The pattern specification unit 403 calculates the concordance rate which reflects the name information 482 and the service information 483. As a result of adopting the foregoing configuration, it is possible to select a recommended facility based on the two axes of name information 482 and service information 483.

The following modifications also fall within the scope of the present invention, and one or more of the modified examples may also be combined with the foregoing embodiments.

(Modified example 1) In the foregoing embodiments, each classification pattern 480 included the two pieces of information of "name information 482" and "service information 483" for identifying the facilities. The processing of the pattern specification unit 403 was also processing based on the foregoing two pieces of information. The present invention is not limited to the foregoing embodiment. In other words, each classification pattern 480 may include information that differs from the "name information 482" and the "service information 483" (for instance, information related to the shop hours of the shop), or may include more types of information.

(Modified example 2) The foregoing embodiments explained a case where the facilities recommended as the destination are presented when the search information (voice data including the classification information 481) for searching for the destination candidates is input from the user in response to the "destination setting operation". The present invention may also be applied to different operations. For example, the recommended air flow and temperature may also be presented to the user in response to the "air-conditioning setting operation". In the foregoing case, the input information that is input from the user (corresponds to the classification information 481) is the setting items such as "temperature" and "air flow", and the operation result (corresponds to the name information 482 and the service information 483) will be "24° C. (in the case of temperature)" and "strong (in the case of air flow)". As a different example, the recommended volume may be presented to the user in response to the "volume setting operation". Here, the input information that is input from the user is setting items such as "volume of music playback" and "volume of guide voice", and the operation result will be "level 14 out of 30 levels". Moreover, the recommended transmit point may also be presented to the user in response to the "setting operation of transit point that is different from the destination". The present invention may also be applied to operations and operation results that differ from the above.

While various embodiments and modified examples were explained above, the present invention is not limited to the subject matter thereof. The present invention also covers other modes that can be conceived within the technical scope of the present invention.

REFERENCE SIGNS LIST

1 . . . information presenting system, 3 . . . in-vehicle terminal, 4 . . . information center, 5 . . . external information providing service

The invention claimed is:

1. An information processing device, comprising:
a pattern storage unit which stores a plurality of user patterns containing a classification pattern as a pair of input information that is input based on an input operation related to a predetermined setting item and one among a plurality of operation results that may be selected as a result of the input operation, for each of the plurality of pieces of input information that are mutually different;
an operation result information input unit to which is input operation result information related to operation results selected by the user with regard to each of the one or more input operations previously performed by the user;
a pattern specification unit which specifies one user pattern among the plurality of stored user patterns based on the input operation result information; and
an operation result selection unit which selects one operation result among a plurality of operation results derived from one of the input operations performed by the user based on the specified one user pattern.

2. The information processing device according to claim 1,
wherein the pattern specification unit calculates a concordance rate of each of the stored plurality of user patterns and the input operation result information, and specifies the one user pattern with a highest concordance rate.

3. The information processing device according to claim 2,
wherein at least one among the plurality of user patterns stored in the pattern storage unit is the user pattern in which a concordance rate becomes highest regarding two or more of the users.

4. The information processing device according to claim 3, further comprising:
a pattern creation unit which, when the user pattern in which a concordance rate with the input operation result information is equal to or greater than a predetermined threshold is not stored in the pattern storage unit, creates a new user pattern in which a concordance rate with the operation result information is equal to or greater than the predetermined threshold and stores the created new user pattern in the pattern storage unit.

5. The information processing device according to claim 4,
wherein each of the plurality of user patterns includes rate of use information indicating a rate of the users who input the operation result information in which a concordance rate regarding the user pattern becomes highest among all of the users, and
wherein the pattern specification unit specifies the one user pattern among the plurality of user patterns based on the rate of use information when there are a plurality of the user patterns in which a concordance rate is highest regarding the users.

6. The information processing device according to claim 5,
wherein each of the plurality of classification patterns included in the user pattern includes a selection frequency of the classification pattern, and
wherein the pattern specification unit calculates the concordance rate which reflects the selection frequency.

7. The information processing device according to claim 6,
wherein each of the plurality of classification patterns included in the user pattern includes a condition that is associated with the classification pattern,
wherein the operation result information including information related to the condition is input to the operation result information input unit, and
wherein the pattern specification unit calculates the concordance rate which reflects the condition.

8. An information presenting system comprising a server equipped with the information processing device according to claim 1, and a client which is communicable with the server,
wherein the client inputs, to the server, the operation result information and the input information related to the one input operation performed by the user, and
wherein the server outputs, to the client, the one operation result selected by the operation result selection unit.

* * * * *